US006947666B2

(12) United States Patent
Chapman et al.

(10) Patent No.: US 6,947,666 B2
(45) Date of Patent: Sep. 20, 2005

(54) SUPPORT APPARATUS AND METHOD FOR USE WITH A CAMERA AND STROBE LIGHTS

(75) Inventors: Charles B Chapman, San Diego, CA (US); Ryan Wilshusen, San Diego, CA (US); Daniel George Gelb, Los Altos, CA (US); Thomas Malzbender, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/690,882

(22) Filed: Oct. 22, 2003

(65) Prior Publication Data

US 2005/0089323 A1   Apr. 28, 2005

(51) Int. Cl.[7] .................. G03B 15/02; G03B 17/00; F16M 11/00
(52) U.S. Cl. .................. 396/4; 396/182; 396/428; 362/11; 248/163.1
(58) Field of Search ............... 396/1, 4, 155, 396/175, 182, 419, 422, 428; 348/370, 371, 348/375; 362/3, 11, 12; 248/163.1, 166, 248/171, 187.1, 432; 355/70

(56) References Cited

U.S. PATENT DOCUMENTS

| | | | |
|---|---|---|---|
| 3,052,156 A | 9/1962 | Blatherwick | |
| 4,030,114 A * | 6/1977 | Telfer | 396/4 |
| 4,219,268 A | 8/1980 | Uchida | |
| 4,616,912 A | 10/1986 | Johnsen | |
| 4,648,697 A * | 3/1987 | Kawazoe | 248/163.1 |
| 4,752,794 A | 6/1988 | Bohannon | |
| 6,515,674 B1 | 2/2003 | Gelb et al. | |

OTHER PUBLICATIONS

T. Malzbender, D. Gelb, and H. Wolters, "Polynomial Texture Maps" in Proceedings of ACM SIGGRAPH 2001, Aug. 12–17, 2001, pp. 519–528.

\* cited by examiner

*Primary Examiner*—W. B. Perkey (57) ABSTRACT

A support apparatus for a camera and strobe lights includes a mounting plate for holding the camera substantially normal to and at a fixed distance from the photograph area, a set of legs attached to one or more portions of the apparatus providing support and positions for mounting and a set of strobe lights affixed to the legs at known positions relative to the focal plane of the camera and directed towards the photograph area to facilitate acquisition of multiple photographic images for use in one or image processing operations. The support apparatus can be automated through the use of one or more mobile strobe lights slidably coupled to each leg, capable of self-propelled linear motion along the axis of the leg and providing indication of its position along the leg to facilitate acquisition of multiple photographic images and position data for the image processing operations.

36 Claims, 6 Drawing Sheets

SUPPORT APPARATUS AND METHOD FOR USE WITH A CAMERA AND STROBE LIGHTS

BACKGROUND

The present invention relates to a camera support device for taking photos. Many digital image processing operations require specialized equipment to gather data before the digital image processing technique can be performed. Polynomial texture mapping is one such digital image processing technique. The technique is described in U.S. Pat. No. 6,515,674 issued Feb. 4, 2003 assigned to the assignee of the present invention and entitled "Apparatus for and of Rendering 3D Objects with Parametric Texture Maps," by Gelb, Wolters, and Malzbender, as well as in "Polynomial Texture Maps," by T. Malzbender, D. Gelb, and H. Wolters, In *Proceedings of ACM SIGGRAPH* 2001, pp. 519–528, Aug. 12–17, 2001.

Once photos are taken with the equipment, polynomial texture mapping processing allows the user to interactively alter the apparent position of the light source in an image as well as its apparent image texture while observing the image on a computer display. For example, a photograph of a valuable archeological artifact can be processed in such a way as the light source can appear directly over the artifact, yielding a low-contrast image. Similarly, the apparent position of the light source can be moved to a very low angle with respect to the artifact, producing a higher contrast image. Beyond this, the apparent surface texture and color of the artifact can be changed from dry and dull white to an oily shiny black finish with the tiny details highlighted by specular reflections.

Powerful visual results from polynomial texture mapping make it a useful technique for the close examination of precious artifacts or forensic evidentiary material that is subject to rigorous handling restrictions. Unfortunately, this technique is currently restricted to the laboratory, because a large hemispherical dome used to support the camera and various strobe lights is bulky and difficult to transport. Consequently, this makes in situ examination of artifacts or evidentiary material problematic and limits the use of this image processing technique.

Other powerful image processing techniques also require specialized equipment to obtain photographs. These other image processing techniques requiring extensive equipment and lighting may also be limited to a laboratory setting like polynomial texture mapping. Accordingly, there is a need to develop more portable and cost-effective equipment for gathering data for use with polynomial texture mapping and other image processing operations.

BRIEF DESCRIPTION OF THE DRAWINGS

Like reference numbers and designations in the various drawings indicate like elements.

SUMMARY OF THE INVENTION

One aspect of the present invention features a support apparatus for a camera and strobe lights. The support apparatus includes a mounting plate for holding the camera above and at a fixed distance from the photograph area, a set of legs attached to one or more portions of the apparatus providing support and positions for mounting and a set of strobe lights affixed to the legs at known positions relative to the focal plane of the camera and directed towards the photograph area to facilitate acquisition of multiple photographic images capable of use in one or more image processing operations.

Another aspect of the present invention also features a support apparatus for a camera and strobe lights. This support apparatus includes a mounting plate for holding the camera above and at a fixed distance from the photograph area, a set of legs attached to one or more portions of the apparatus providing support and positions for mounting and a mobile strobe light slidably coupled to each leg, capable of self-propelled linear motion along the axis of the leg and providing indication of its position along the leg to facilitate acquisition of multiple photographic images capable of use in one or more image processing operations.

DETAILED DESCRIPTION

Embodiments of the present invention concern the use of specialized data gathering equipment for various image-processing operations. While the description contained herein describes polynomial texture mapping as one image processing operation, many other image processing operations would also benefit from embodiments of the present invention. For example, alternate embodiments could be used to gather data for an image processing technique called "shape from shading" that recreates the shape of an object according to the various shades and/or shadows caused by the interplay of light upon the object. Accordingly, the mention of polynomial texture mapping is described as a convenient way of describing one embodiment of the present invention and should not serve to limit any aspect of the invention to polynomial texture mapping or any particular feature included or excluded specifically for this one purpose or application.

Polynomial texture mapping is one exemplary image processing operation that allows an image of an object to be interactively manipulated in a way as to reveal extremely fine or faint details. The details revealed are far beyond those revealed by simple contrast enhancement of an ordinary photograph. This ability to enhance and reveal extremely faint detail makes polynomial texture mapping a valuable tool for in situ forensic evidentiary examination, archeological artifact examination, and other detailed study where there is insufficient detail exhibited by ordinary photographs.

The data for polynomial texture mapping includes multiple images of a specimen object. The images are taken with a digital camera in a fixed position above the object. Each image is lit by a light source at a different position. Typically, a number of different angles around the object (azimuth) and different elevations with respect to the horizontal plane of the object are used to position the light source for each image. These angles around the object are also referred to as azimuth positions.

Aspects of the present invention are advantageous in at least one or more of the following ways.

Embodiments of the present invention allow the image data for polynomial texture mapping to be easily collected in the field using a portable support apparatus for the camera and strobe lights. The support apparatus comprises a special camera mounting plate that allows the camera to take photographs through an aperture in the mounting plate. This allows the camera to be positioned at a fixed distance above the area being photographed. The legs, which can be attached to the mounting plate, further providing support for the strobe lights.

Strobe lights mounted on different legs allow different azimuthal images to be acquired as rapidly as the camera can be cycled and the strobe lights flashed. The strobe lights are slidable along the length of the legs and fixable at known distances from the focal plane of the camera. Strobe lights mounted at or moved to different points of fixation along the length of the leg allow different elevation images to be acquired. Additionally, the strobe lights are rotatable around the axis of the leg facilitating compaction and transportation of the support apparatus.

Further embodiments of the present invention allow the strobe lights to move automatically along the length of the leg. This allows the rapid and accurate collection of large numbers of images for polynomial texture mapping. This is highly advantageous to the gathering of forensic evidence where time at the scene of the evidence may be limited and accuracy in obtaining evidentiary material is of the utmost importance.

Figures 1A, 1B:
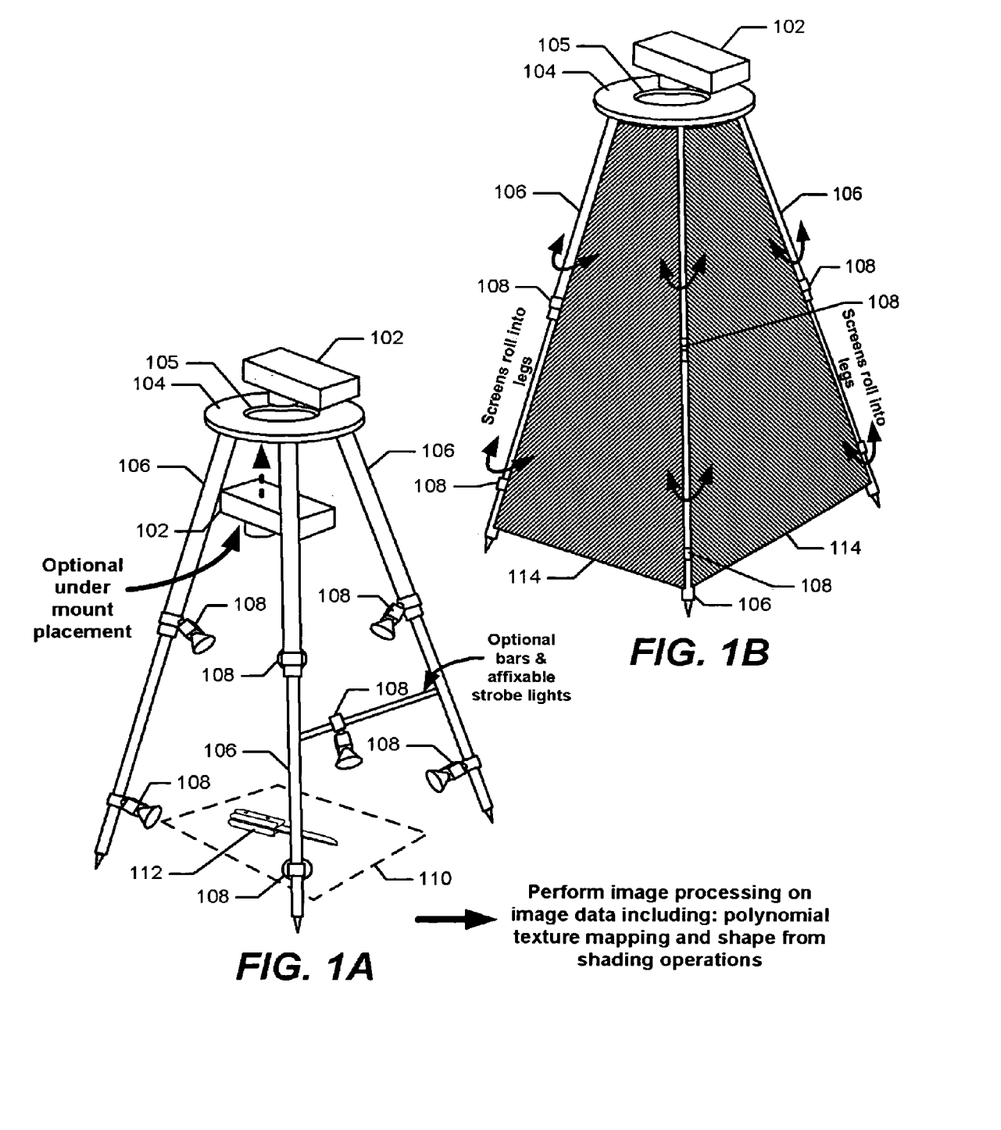
FIG. 1A is a perspective view of the support apparatus according to one embodiment of the present invention.
FIG. 1B is a perspective view of the support apparatus with the light-g shielding screens attached, according to one embodiment of the present invention.

While not illustrated specifically, additional legs can be added to increase the number of azimuthal positions for the lights. These additional legs can provide added support for the overall structure or apparatus or may extend downward without contacting the ground or providing further support. For example, a tripod is illustrated using these support legs. However, a lesser or greater number of legs can be used to support the apparatus. Moreover, a monopod (i.e., one support leg) can be combined with several non-supporting legs extending downward to provide additional azimuthal mounting points for lighting and other accessories. This monopod would be highly portable and functional, yet may be less stable in operation Turning first to FIG. 1A, a perspective view of the camera and strobe support apparatus is illustrated according to one embodiment of the present invention. A camera 102 is mounted facing down towards a photograph area 110 and is supported by a mounting plate 104. Mounting plate 104 has an aperture 105 that allows the camera 102 to see a photograph area 110. A set of legs 106, connected to mounting plate 104, supports mounting plate 104 and camera 102 in a stable manner. Connected to legs 106 is a set of strobe lights 108 that can be directed towards a specimen object 112 within photograph area 110. The portability of the support apparatus allows camera 102 to be positioned above the specimen object 112. FIG. 1B shows light-shielding screens 114 attached between legs 106.

Camera 102 is generally a digital camera. The digital camera is advantageous to polynomial texture mapping because polynomial texture mapping readily adapts to the camera's digital image data. It is also very convenient to use digital photography. For example, having the image in digital form eliminates the time-consuming steps of film development and digital scanning of multiple film images.

Mounting plate 104 holds the camera 102 with its lens facing down and substantially normal to and at a fixed distance from the area being photographed. Aperture 105 in mounting plate 104 allows the camera to see photograph area 110 directly beneath camera 102. In alternate embodiments, camera 102 is mounted on the bottom surface of mounting plate 104 or mounting plate 104 is comprised of an optically clear material with camera 102 mounted on its upper surface. Legs 106 securely support the mounting plate.

In one embodiment of the present invention, legs 106 are a set of three legs attached to mounting plate 104 that form a tripod. In yet another embodiment, legs 106 have a telescoping feature to aid in the compaction and transportation of the support apparatus.

Attached to legs 106 are strobe lights 108. The various mounting points of strobe lights 108 allow acquisition of a number of differently lit images of specimen object 112. For each image, a single strobe light from strobe lights 108 is flashed or "fired" while the shutter of camera 102 is open. Additionally, each image is lit by a differently positioned strobe light in strobe lights 108. In other words, for polynomial texture mapping, no two images in the image set are lit from the same position.

The firing of the strobe lights 108 can be accomplished with a sequencing device. Using the sequencing device, the shutter of camera 102 is opened, a single strobe light from strobe lights 108 is fired once, and then the shutter of camera 102 is closed. The captured image is stored and a different strobe light from strobe lights 108 is selected and the process is repeated until all strobe lights 108 have been fired. Moving the strobes to different known positions along legs 106 and repeating the above sequence allows the acquisition of additional images.

Frequently, in forensic evidentiary photography, archeological photography, or in other photographic scenes, it is desirable to photograph specimen object 112 in situ without disturbing either the object or its environment. The portability of the support apparatus allows it to be positioned so that specimen object 112 resides within the center of photograph area 110. In police work, in situ photography and evidence gathering is particularly important. For example, frequent moving or handling of evidentiary material may result in a complex chain of custody. This chain of custody may impact the value of the evidence due to the increased possibility of tampering or contamination. Using polynomial texture mapping photography to capture evidence in situ results in a shorter chain of custody and increased evidentiary value of specimen 112 and other photographed items.

As previously described, polynomial texture mapping relies on a set of data images, each lit from a different single point. It is therefore desirable to exclude ambient light from the area being photographed 110. Light-shielding screens 114, shown in FIG. 1B, serve to block out ambient light and ensure that each image is lit by light from only the strobe light that is fired. In one embodiment of the present invention, light-shielding screens 114 are attached between adjacent legs 106. The screens can be composed of either rigid or flexible material. In another embodiment of the present invention, screens 114 roll out from legs 106 and attach to adjacent legs 106. Alternate embodiments that construct the screens 114 from a material that blocks infrared as well as ultraviolet light allow polynomial texture mapping to be performed with light frequencies outside the visible spectrum.

Figure 2:
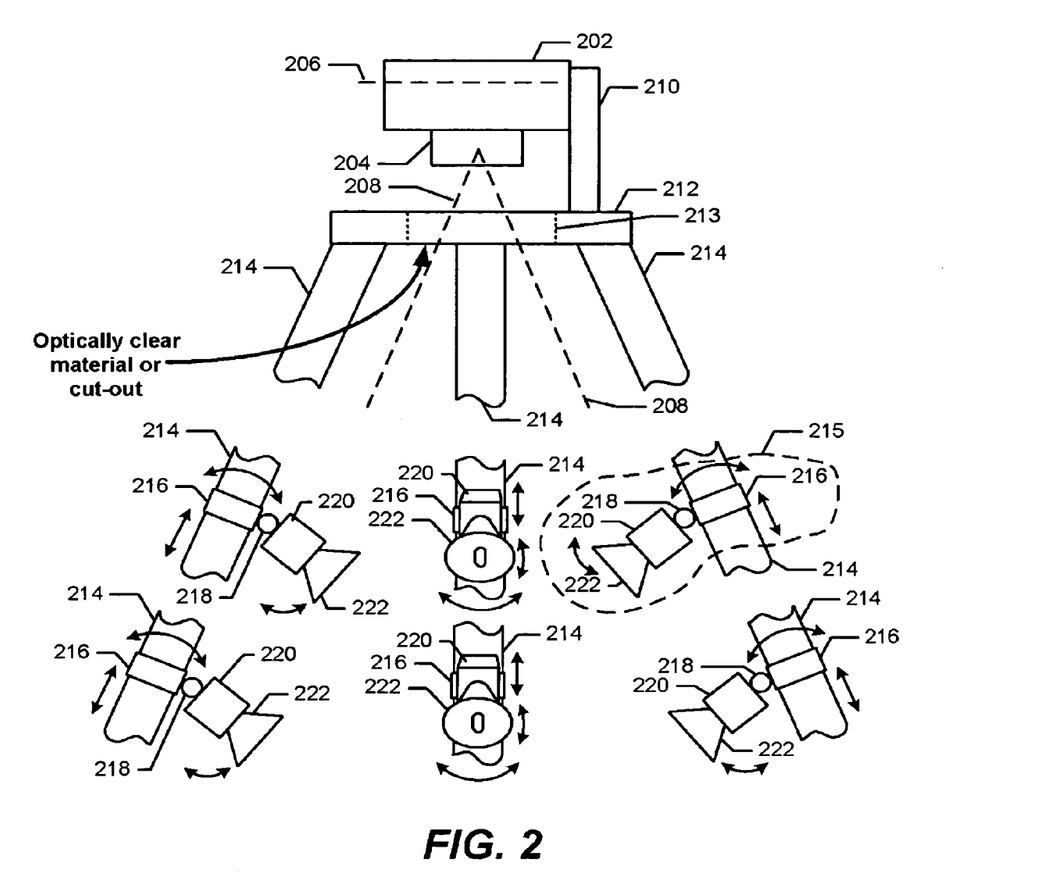
FIG. 2 is a side view of the support apparatus according to one embodiment of the present invention.

Turning now to FIG. 2, a side view of the support apparatus according to one embodiment of the present invention. A camera 202 is attached to a camera bracket 210, which in turn is attached to a mounting plate 212. Attached to camera 202 is its lens 204, which forms a focused image at the focal plane 206 of the camera 202. Mounting plate 212 has an aperture 213 allowing the camera's field of view 208 to be unobstructed by mounting plate 212. Attached to the mounting plate 212 is a set of legs 214. Attached to legs 214 is a set of strobe light assemblies as exemplified by strobe light assembly 215. In one embodiment, strobe light assembly 215 is comprised of a swivel mounting-ring 216 connected to its associated leg 214. A ball joint 218 connects swivel mounting-ring 216 to a strobe light body 220. Attached to strobe light body 220 is a strobe lamp reflector and lens 222.

As previously described, camera 202 is typically a digital camera that mounts, with lens 204 facing down along the length of camera mounting-bracket 210. With conventional camera tripods, this type of mounting is problematic due to the obstruction of the camera's field of view by either the mounting plate or the legs. Embodiments of the present invention employ a mounting plate with an aperture 213 allowing the camera's field of view 208 to be unobstructed by either mounting plate 212 or legs 214.

Camera lens 204 can be either a fixed focal length lens or it can be a variable focal length zoom lens. The zoom lens allows optimal framing of the object being photographed, yielding more detail. In either of these lens embodiments, the shorter the lens focal length, the wider the field of view 208.

Camera lens 204 typically has a built-in automatic diaphragm to control the depth of focus and the amount of light reaching the image sensor (not shown) mounted inside the camera at the focal plane 206. This type of lens is termed an "automatic lens." An automatic lens allows focusing with its diaphragm set at its widest opening. This yields a bright image with a narrow depth of field, allowing the proper focus to be readily determined.

In one embodiment of the present invention, three of legs 214 form a tripod. The tripod configuration of the legs provides a stable structure for the support apparatus. Legs 214 are provided with detents at known positions so that various strobe light assemblies such as strobe light assembly 215 can be placed at different positions along the leg to increase the number of images for the polynomial texture mapping data set. The detent positions can be linearly spaced or non-linearly spaced along the length of the leg. For example, one non-linear spacing of the detents can make moving to the next detent result in a constant elevation angle displacement with respect to the horizontal plane. Fixed detent positions are advantageous because they reduce the error in the placement of strobe assembly 215.

In another embodiment, the strobe assembly 215 can be affixable along the axis of a bar mounted at least at one point to at least one leg. For example, mounting the strobe assembly 215 at different points along a bar mounted horizontally between two legs would result in a different azimuth angle for the strobe light as it was affixed at each mounting point.

Swivel mounting-ring 216 attaches strobe assembly 215 to each of legs 214 in a slidable manner. In addition to permitting strobe assembly 215 to be moved up and down the leg, swivel ring 216 allows strobe assembly 215 to be rotated around the axis of the leg, allowing legs 214 to be compactly folded together for transportation of the support apparatus.

Ball joint 218 allows vertical and horizontal movement of strobe body 220 so that strobe lamp reflector and lens 222 can be directed towards the subject, regardless of the position of strobe assembly 215 along its associated leg 214. For example, if strobe assembly 215 is positioned near the bottom of its associated leg 214, then strobe body 220 should be pointed at an angle close to the horizontal plane. If strobe assembly 215 is positioned near the top of its associated leg 214, then strobe body 220 should be rotated closer to vertical.

Strobe body 220 serves to hold a strobe lamp and serves as a mounting point for strobe lamp reflector and lens assembly 222. Strobe lamp and reflector and lens assembly 222 provides an even field of illumination over the photograph area.

Figure 3:
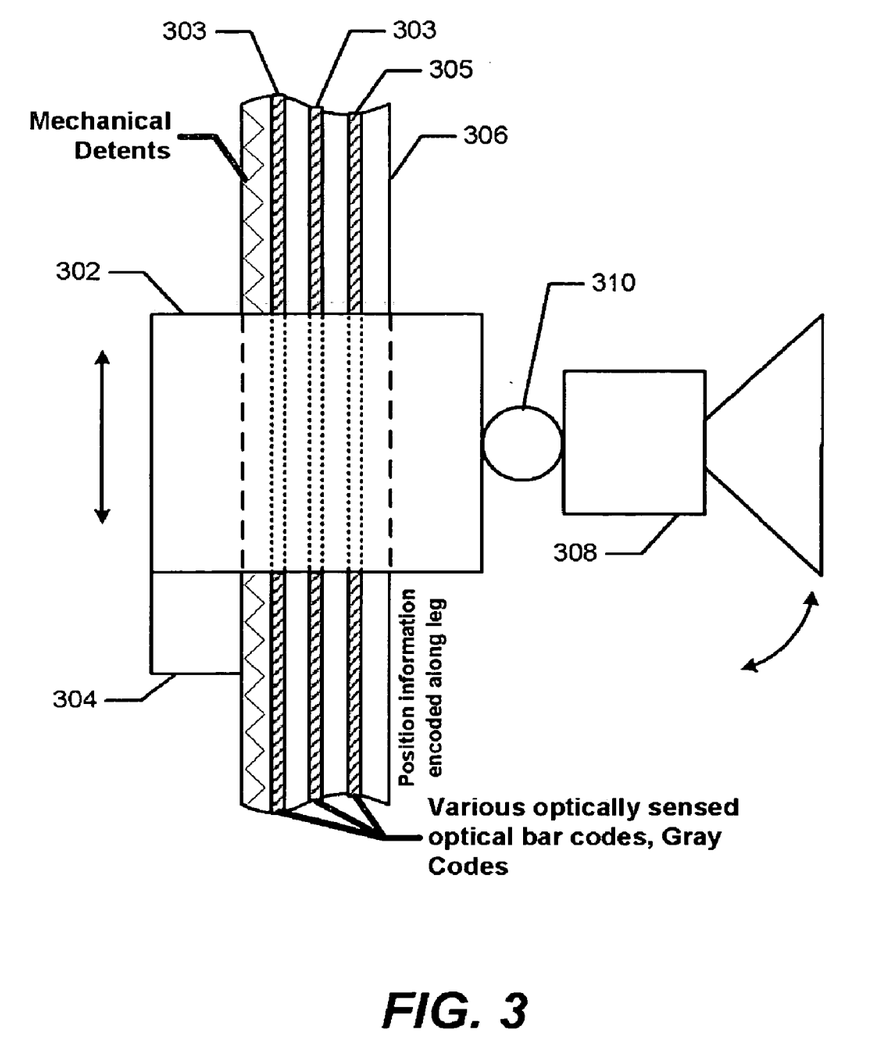
FIG. 3 is a side view of a self-propelled mobile strobe light assembly according to one embodiment of the present invention.

FIG. 3 shows a side view of a mobile strobe light slidably coupled to a leg 306 in accordance with one embodiment of the present invention. A self-propelled mobile assembly 302 is capable of linear motion along the length of leg 306. The position of mobile assembly 302 is sensed by position sensor 304. Coupling 310 allows strobe light 308 to rotate in the vertical plane. The rotational motion of strobe light 308 is motorized and can be controlled independently of the motion of self-propelled mobile assembly 302.

Self-propelled mobile assembly 302 allows strobe light 308 to be automatically positioned along the length of leg 306. Self-positioning of the strobe light is advantageous in that it saves time when collecting a large number of images and it assures accuracy in positioning strobe light 308. Speed and accuracy are very important factors in the collection of forensic evidence.

An internal motor propels mobile assembly 302. A typical motor for this type of application is a stepper motor. Instead of spinning continuously, the stepper motor rotates in small increments or steps and is often used in printers and plotters where there is much start-stop motion and accurate positioning is required. Power to the motor can be supplied via insulated rails 303 to a brush assembly inside mobile assembly 302. Commands to the motor can be supplied via a similar third rail 305. To facilitate compaction of the support apparatus, mobile assembly 302 is removable from leg 306.

As previously described, it is desirable that the position of the strobe light be known for each image in the polynomial texture mapping data set. Position sensor 304 determines the position of mobile assembly 302 along leg 306. Position along the leg can be encoded in a variety of ways including an optical Gray code, optical bar code, or mechanical detents sensed with micro switches. Optically sensed Gray codes are often used to convey positional information in mechanical devices. A Gray code is attractive for use in position sensing because there is no chance for a single bit error to introduce ambiguity as the code changes between adjacent positions. This is because the code is fashioned so that there is only a single bit change between all adjacent positions. For example, if a binary code were used to encode position, changing from position-15 to position-16 would cause five bits in the code to change state. If the mobile assembly stopped between position-15 and position-16 there is a chance that all of the bits would not change state and that an erroneous position would be reported. In such a case, a Gray code would report either position-15 or position-16 and no other. The aforementioned third rail can also be used to return position data to a central sequencer and controller.

As the position of mobile assembly 302 changes, the angle between the subject and strobe light 308 also changes. It is desirable that strobe light 308 point directly at the subject, regardless of the position of mobile assembly 302. To facilitate this, strobe light 308 is rotatably coupled to mobile assembly 302 through a motorized coupling 310. Using a stepper motor similar to that of mobile assembly 302, the angle of the strobe light can be varied according to the position of the mobile assembly along the length of the leg 306. In this manner, strobe light 308 can remain aimed directly at the subject, regardless of its position along the leg.

Figure 4A:
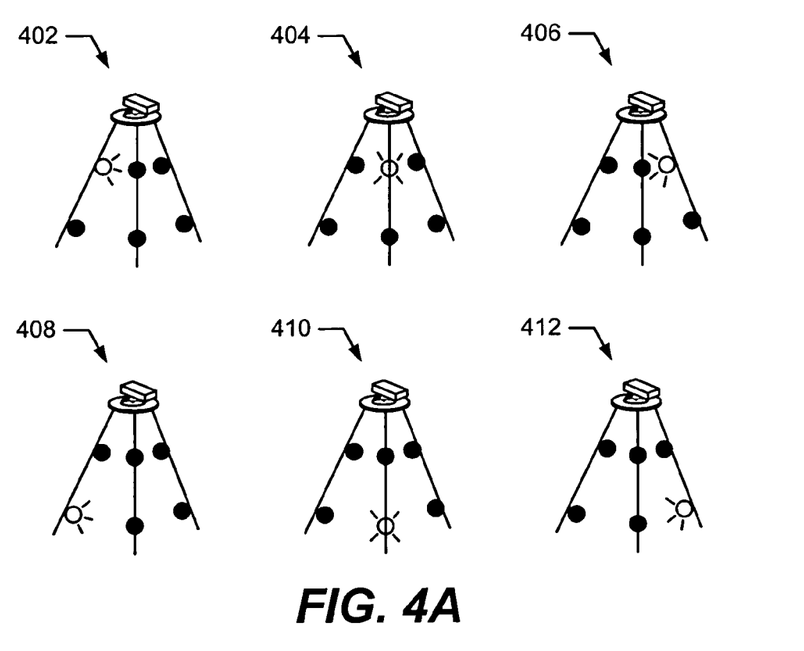
FIG. 4 depicts a sequence of strobe light firings according to one embodiment of the present invention.

FIG. 4A depicts a typical strobe light firing sequence in accordance with one embodiment of the present invention. As previously described, the firing of a strobe light results in the formation of a single image for the multi-image polynomial texture mapping data set. The six depictions 402, 404, 406, 408, 410, and 412 show a single support apparatus with six strobe lights, two of which are mounted to each leg. In each of the six depictions 402, 404, 406, 408, 410, and 412 a single strobe light is shown firing. For example, in depiction 402, the top strobe light on the left leg of the support apparatus is shown firing. In depiction 404, the top strobe light on the center leg of the support apparatus is shown firing. In total, the sequence of strobe light firings results in the creation of six data images.

Figure 4B:
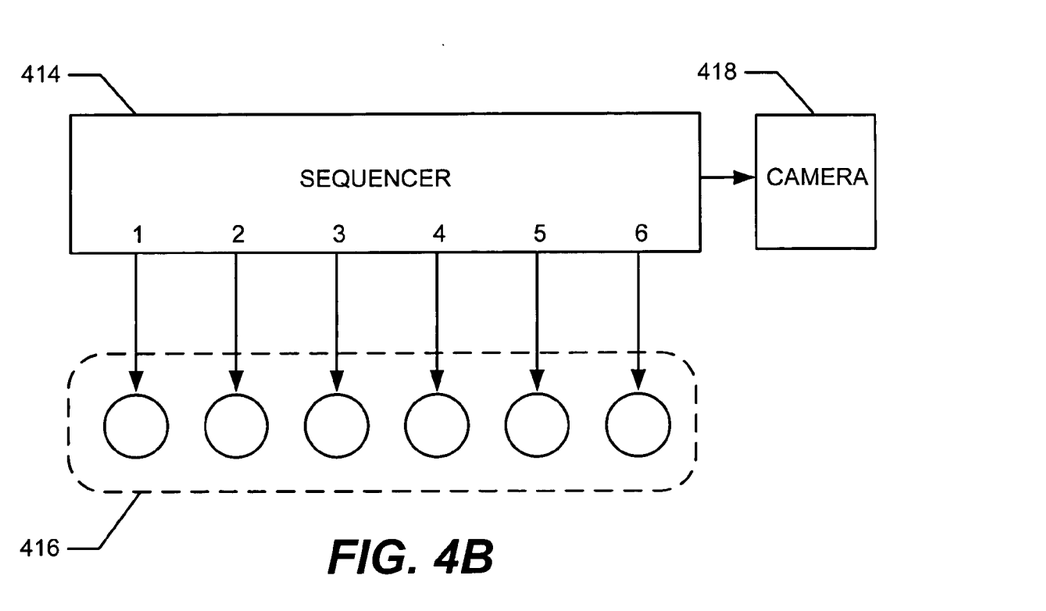

FIG. 4B depicts a typical strobe light firing sequencer 414 in accordance with one embodiment of the present invention. The sequencer 414 is connected to a set of strobe lights 416 and a camera 418. In this example, there are six strobe lights. The sequencer 414 can be programmed to fire the individual strobe lights in any order. After each strobe light is fired, the camera 418 is advanced in preparation for the next photograph.

Figure 5:
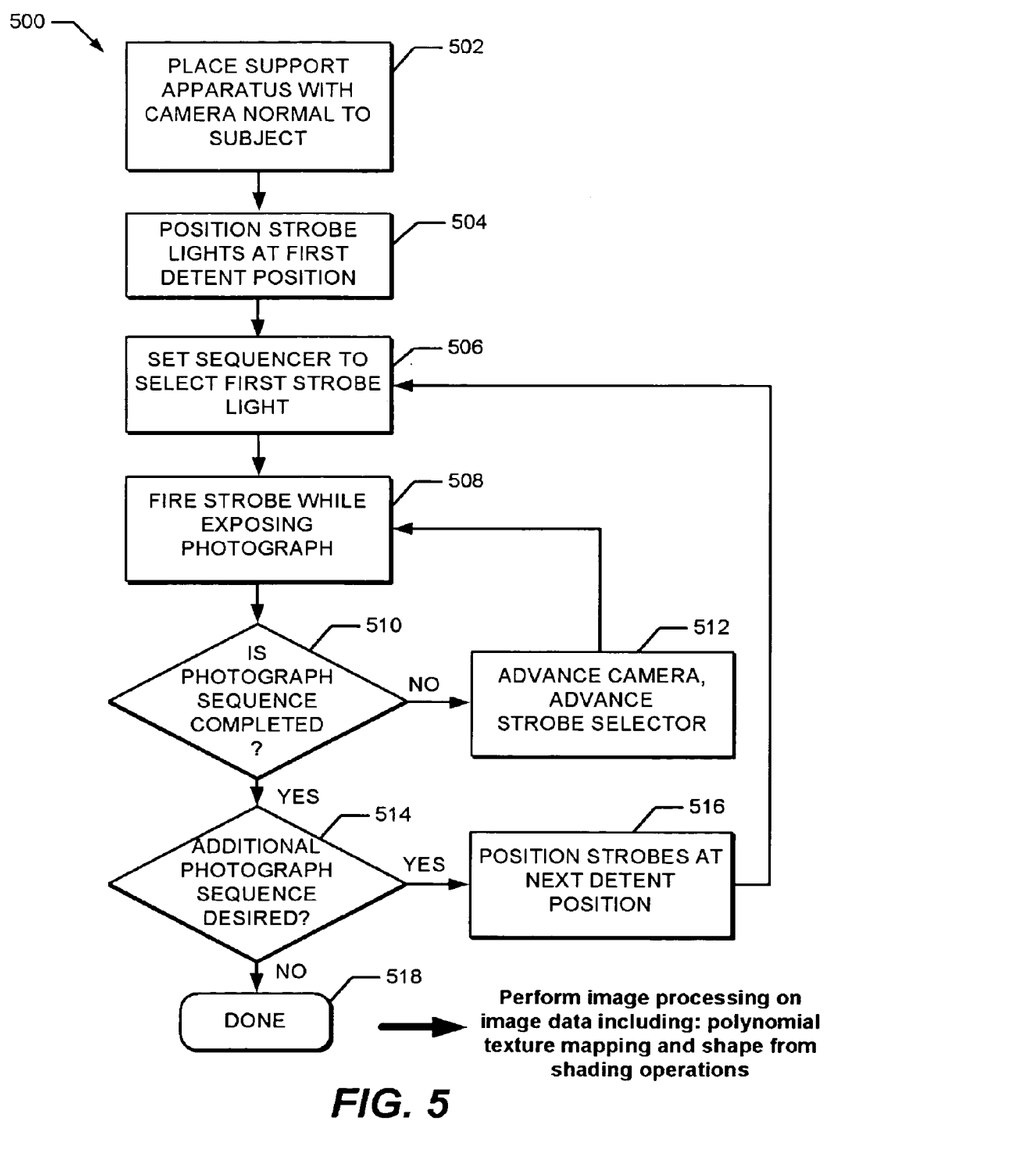
FIG. 5 is a flowchart diagram of the operations pertaining to acquiring polynomial texture mapping data using manually positioned strobe lights according to one embodiment of the present invention.

FIG. 5 is a flowchart diagram of the operations for obtaining a set of digital photographs 500 with manually positioned strobe lights to be used with polynomial texture mapping, in accordance with one embodiment of the present invention. As previously described, polynomial texture mapping is a digital image processing technique that relies on having a number of images of the subject object. For each of the images, the camera and subject remain in the same position and the position of the lighting changes.

First, the support apparatus is placed with the camera substantially normal to the subject (502). If the camera has a zoom lens, then the focal length of the lens is adjusted to optimally frame the subject. The camera lens is then focused and the optimum lens aperture is determined and set.

Next, the strobe lights are positioned at the first detent positions (504) along the length of the legs. Rather than having a separate strobe light at every lighting position, the support apparatus can be made lighter and more portable by having only one to several strobe lights per leg. Moving the strobe lights to different positions along the length of the leg allows a multiplicity of images to be obtained using as few as one strobe light per leg.

The strobe sequencer is now set to select the first strobe light (506). The sequencer controls the camera and the sequential firing of the strobe lights. The sequencer can be either automatic or manual. Before the first exposure is made, the light-shielding screens can be attached to the support apparatus as needed to block ambient light from the photographs.

With the support apparatus now in position, the camera focused, the strobe lights positioned, and the sequencer set, the first sequence of photographs can now be taken. A "sequence" refers to a set of photographs with the strobe lights at a given position. Typically, multiple sequences are used to collect a set of images used for a single polynomial texture mapping analysis.

Firing the strobe light while exposing the photograph (508) captures an image. Typically, a single strobe-lit photograph comprises the following steps. Upon receiving a signal from the sequencer, the camera lens diaphragm closes to its predetermined opening and the camera shutter opens. The strobe light is then fired. A built-in exposure sensor in the camera determines the length of the strobe light flash. After the strobe light is extinguished, the shutter is closed and the captured image is stored in the camera's memory.

The sequencer then determines if the photographic sequence is complete (510). If the sequence is not complete, then the sequencer advances the camera and the next strobe light in the sequence is selected (512). A new photograph is then taken as before in (508). If the sequence is complete, then it is decided if an additional photograph sequence is desired (514).

If an additional photograph sequence is desired, then the strobe lights are positioned at the next detent positions (516). The sequencer is then set to select the first strobe light (506) and then the sequence of photographs is taken as before. If an additional photograph sequence is not desired, then the process is done (518).

Figure 6:
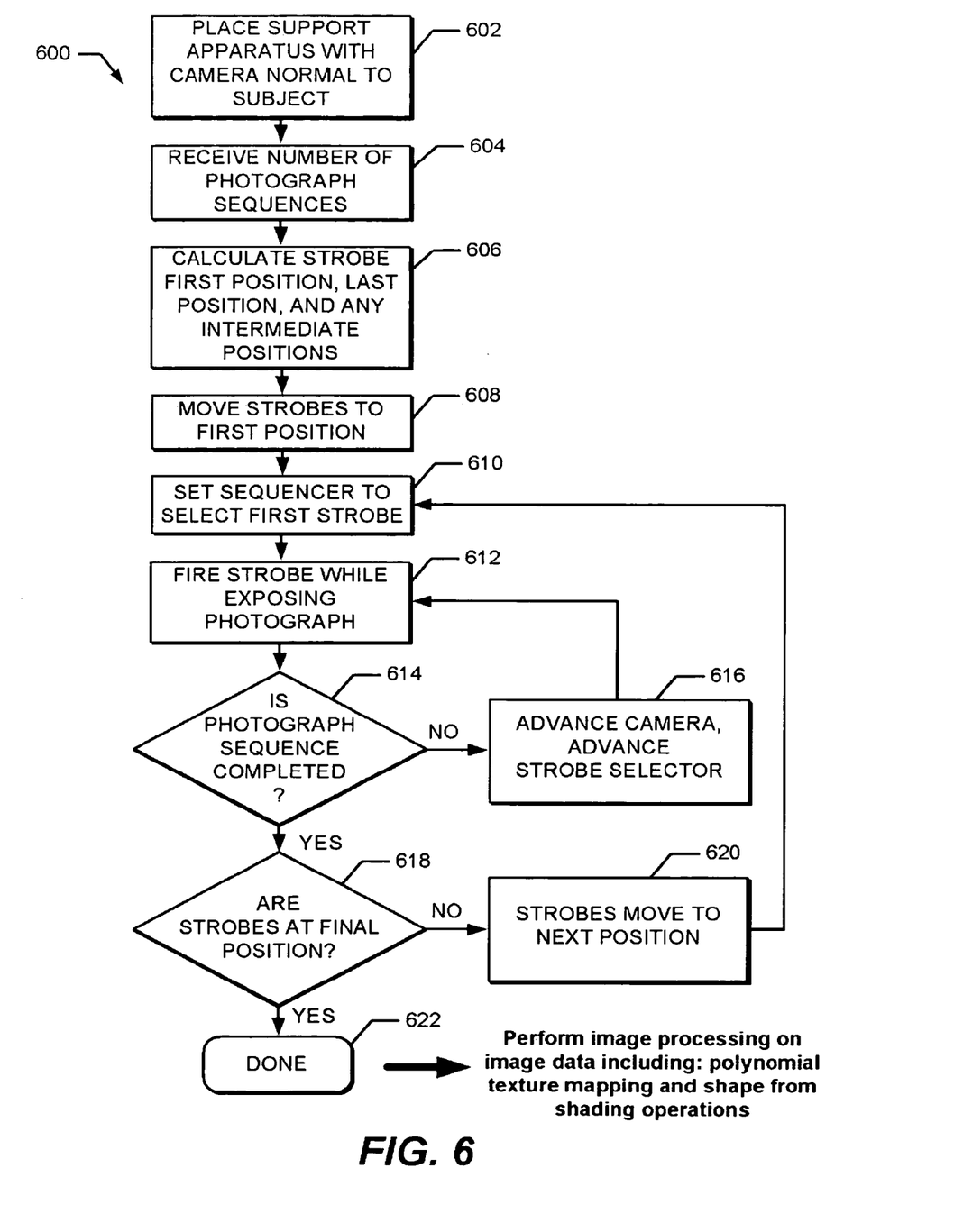
FIG. 6 is a flowchart diagram of the operations pertaining to acquiring polynomial texture mapping data using automatically positioned strobe lights according to one embodiment of the present invention.

FIG. 6 is a flowchart diagram of the operations for obtaining a set of digital photographs 600 with automatically positioned strobe lights to be used with polynomial texture mapping, in accordance with one embodiment of the present invention. As previously described, polynomial texture mapping is a digital image processing technique that relies on having a number of images of the subject object. For each of the images, the camera and subject remain in the same position and the position of the lighting changes.

First, the support apparatus is placed with the camera substantially normal to the subject (602). If the camera has a zoom lens, then the focal length of the lens is adjusted to optimally frame the subject. The camera lens is then focused and the optimum lens aperture is determined and set.

As with the support apparatus in FIG. 5 having manually positioned strobe lights, the support apparatus can be made lighter and more portable by having only one automatically positioned strobe light per leg rather than having a separate strobe light at every lighting position. Automatically moving the single strobe light to different positions along the length of the leg allows a multiplicity of images to be rapidly obtained.

Next, the sequencer receives a parameter specifying the number of photograph sequences (604) to be made. Based upon the number of photograph sequences needed, the first and final strobe light positions along with any required intermediate positions can be calculated (606). In one embodiment, constant linear displacement of the strobe light along the leg translates into variable linear angular elevation change of the strobe light with respect to the subject. For constant angular change between sequences, an alternate embodiment calculates separate linear displacements. This calculation varies with the total number of sequences desired. After calculating the strobe light positions, the strobe lights are moved to their first positions (608).

The strobe light sequencer is now set to select the first strobe light (610). The sequencer controls the camera and the sequential firing of the strobe lights. The sequencer is automatic. The light-shielding screens can be attached as needed to the support apparatus to block ambient light from the photographs before the first exposure is made.

Firing the strobe light while the camera lens is open (612) captures an image. As previously described, typically, a single strobe-lit photograph comprises the following steps. Upon receiving a signal from the sequencer, the camera lens diaphragm closes to its predetermined opening and the camera shutter opens. The strobe light is then fired. A built-in exposure sensor in the camera determines the length of the strobe flash. After the strobe light is extinguished, the shutter is closed and the captured image is stored in the camera's memory.

The sequencer then determines if the photographic sequence is complete (614). If the sequence is not complete, then the sequencer advances (616) the camera and the next strobe light in the sequence is selected. A new photograph is then taken as before in (612). If the sequence is complete, then it is decided if the strobe lights are at their final positions (618).

If the strobe lights are not at their final positions, then the strobe lights move to the next position (620). The sequencer is then set to select the first strobe light (610) and then the sequence of photographs is taken as before. If the strobe lights are at their final positions, then the process is done (622).

While specific embodiments have been described herein for the purposes of illustration, various modifications may be made without departing from the spirit and scope of the invention. For example, figures and descriptions above reference using embodiments of the present invention with polynomial texture mapping image process operation, however alternate embodiments of the present invention can be readily adapted for use with other image processing operation including, for example, shape from shading and others. These image-processing operations also would benefit by the portability of the present invention and the flexibility of positioning the lights and camera. Further, figures and descriptions also reference using a tripod having three support legs however, alternate embodiments contemplate using greater or fewer legs and support for the apparatus or to provide additional azimuthal angles for mounting strobe lights. These additional legs can be used for support or purely for additional azimuthal positions. Accordingly, the invention is not limited to the above-described embodiments, but instead is defined by the appended claims in light of their full scope of equivalents.

What is claimed is:

1. A support apparatus for a camera and strobe lights, comprising:
    a mounting plate configured to receive a camera mounted on the mounting plate bottom surface for holding the camera substantially normal to and at a fixed distance from the photograph area;
    a set of legs attached to one or more portions of the apparatus providing support and positions for mounting; and
    a set of strobe lights affixed to the legs at known positions relative to the focal plane of the camera and directed towards the photograph area to facilitate acquisition of multiple photographic images capable of use in one or image processing operations.

2. The apparatus of claim 1 wherein the image processing operations are selected from a set of image processing operations including polynomial texture mapping and shape from shading.

3. The apparatus of claim 1 wherein one or more legs of the set of legs are attached to and supporting the mounting plate and wherein other legs of the set legs are attached to the mounting plate and other areas of the apparatus to provide the strobe lights with different azimuthal mounting points around the mounting plate.

4. The apparatus of claim 1 wherein the mounting plate is configured to receive a camera mounted on the mounting plate top surface and looking down through an aperture in the mounting plate.

5. The apparatus of claim 1 wherein the mounting plate comprises an optically clear material and is configured to receive a camera mounted on the mounting plate top surface.

6. The apparatus of claim 1 wherein the mounting plate and set of legs comprises a tripod.

7. The apparatus of claim 1 wherein the legs are telescoping.

8. The apparatus of claim 1 wherein a screen is attached between each of the legs, shielding the photograph area from ambient light.

9. The apparatus of claim 1 wherein a screen rolls out from one leg and attaches to an adjacent leg, shielding the photograph area from ambient light.

10. The apparatus of claim 1 further comprising a sequence controller to control the camera and sequential firing of the set of strobe lights.

11. The apparatus of claim 1 wherein the set of strobe lights are affixed with swivel mounts that allow the strobe lights to be rotated around the axis of the legs to facilitate compaction of the apparatus.

12. The apparatus of claim 1 wherein the strobe lights are affixable along the axis of the leg at one or more points of fixation.

13. The apparatus of claim 12 wherein the points of fixation are made with detents.

14. The apparatus of claim 1 wherein the strobe lights are affixable along the axis of a bar wherein at least one point on the bar is attached to at least one leg.

15. A support apparatus for a camera and strobe lights, comprising:
    a mounting plate for holding the camera normal to and at a fixed distance from the photograph area;
    a set of legs attached to one or more portions of the apparatus providing support and positions for mounting; and
    a mobile strobe light slidably coupled to each leg, capable of self-propelled linear motion along the axis of the leg and providing indication of its position along the leg to facilitate acquisition of multiple photographic images capable of use in one or image processing operations.

16. The apparatus of claim 15 wherein the image processing operations are selected from a set of image processing operations including polynomial texture mapping and shape from shading.

17. The apparatus of claim 15 wherein one or more legs are attached to and support the mounting plate and other legs are attached to the mounting plate and other areas of the azimuth points around the mounting plate for mounting.

18. The apparatus of claim 15 wherein the mounting plate and a set of legs comprises a tripod.

19. The apparatus of claim 15 wherein the legs are telescoping.

20. The apparatus of claim 15 wherein a screen is attached between each of the legs to shield the photograph area from ambient light.

21. The apparatus of claim 15 wherein a screen rolls out from one leg and attaches to an adjacent leg to shield the photograph area from ambient light.

22. The apparatus of claim 15 further comprising a sequence controller to control the camera, position of the strobe lights, and sequential firing of the strobe lights.

23. The apparatus of claim 15 wherein the strobe lights are removable from the legs to facilitate compaction of the apparatus.

24. The apparatus of claim 15 wherein the strobe light rotates in elevation automatically according to its position along the leg in order to shine its light directly on the center of the photograph area.

25. The apparatus of claim 15 wherein the strobe light position is sensed by reading position information on the leg.

26. The apparatus of claim 25 wherein the position information is selected from a set of positional encodings including: optical Gray code, optical bar code, and mechanical detents.

27. A method of acquiring a set of photographs, comprising:
supporting a camera substantially normal to the photograph area;
positioning a set of strobe lights at predetermined positions along a set of legs; and
controlling the sequential firing of the set of strobe lights and acquisition of the resultant photographic images to be used in one or more image processing operations.

28. The method of claim 27 wherein the image processing operations are selected from a set of image processing operations including polynomial texture mapping and shape from shading.

29. The method of claim 27 wherein one or more legs of the set of legs are attached to and support the mounting plate and wherein other legs of the set of legs are attached to the mounting plate and other areas of the apparatus to provide the strobe lights with different azimuthal points around the mounting plate.

30. The method of claim 27 wherein the strobe lights are repositioned and sequentially fired to obtain additional photographic images to be used in polynomial texture mapping.

31. A method of acquiring a set of photographs using a supported camera and movable strobe lights, comprising:
calculating a first strobe light position and second strobe light position along the axis of a leg supporting the strobe light;
moving at least one strobe light to the first strobe light position automatically;
controlling the firing of at least one strobe light in the first strobe light position and acquisition of the resultant photographic image to be used in polynomial texture mapping; and
moving automatically one strobe light from the first strobe light position to the second strobe light position.

32. The method of claim 31 wherein the first strobe light position and the second strobe light position are determined according to a photograph sequence parameter that specifies the number of photograph sequences to be obtained; and wherein a photograph sequence represents photographic images lit by strobe lights in a set of positions.

33. The method of claim 32 further comprising one or more intermediate strobe light positions between the first strobe light position and the second strobe light position.

34. The method of claim 33 wherein the positions between the first strobe light position and the second strobe light position are spaced along the axis of the leg to provide consistent linear angular displacements with respect to the photographic subject.

35. An apparatus for acquiring a set of photographs, comprising:
means for supporting a camera normal to the photograph area;
means for positioning strobe lights at predetermined positions along the legs attached to one or more portions of the apparatus; and
means for controlling the sequential firing of the positioned strobe lights and acquisition of the resultant photographic images to be used in one or more image processing operations.

36. An apparatus for acquiring a set of photographs using a supported camera and strobe lights that are movable along the apparatus, comprising:
means for calculating a first strobe light position and second strobe light position along the axis of a leg supporting at least one strobe light;
means for moving automatically at least one strobe light to the first strobe light position;
means for controlling the firing of at least one strobe light in the first strobe light position and acquisition of the resultant photographic images to be used in polynomial texture mapping; and
means for moving automatically at least one strobe light from the first strobe light position to the second strobe light position.

* * * * *

UNITED STATES PATENT AND TRADEMARK OFFICE
CERTIFICATE OF CORRECTION

| | | |
|---|---|---|
| PATENT NO. | : 6,947,666 B2 | Page 1 of 1 |
| APPLICATION NO. | : 10/690882 | |
| DATED | : September 20, 2005 | |
| INVENTOR(S) | : Charles B. Chapman et al. | |

It is certified that error appears in the above-identified patent and that said Letters Patent is hereby corrected as shown below:

Column 1, line 59, delete "light-g shielding" and insert therefor --light shielding--

IN THE CLAIMS

Claim 1, Column 9, line 60, after "one or" insert --more--

Signed and Sealed this

Twenty-seventh Day of May, 2008

JON W. DUDAS
*Director of the United States Patent and Trademark Office*